Figure 1:
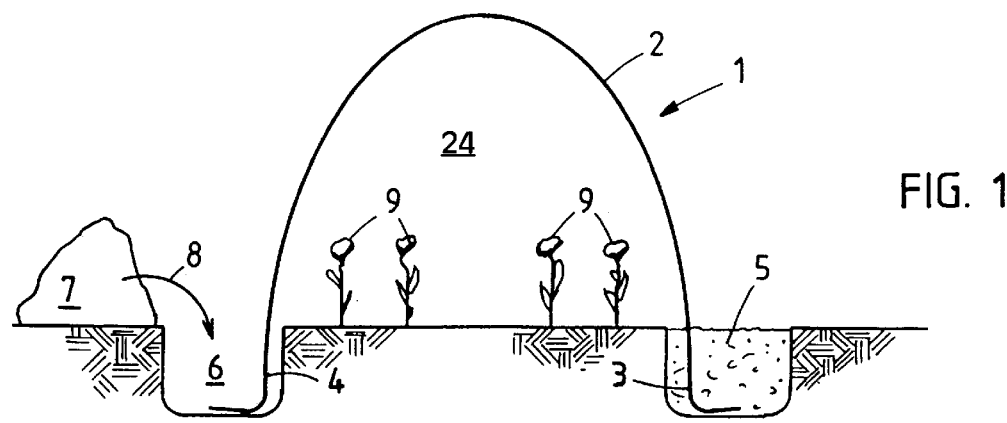

United States Patent [19]
de Ridder

[11] Patent Number: 5,815,991
[45] Date of Patent: Oct. 6, 1998

[54] INFLATABLE BUILDING CONSTRUCTION

[76] Inventor: Dick Nicolaas de Ridder, Melkweg 58, 7871 PH Klijndijk, Netherlands

[21] Appl. No.: 700,557

[22] Filed: Aug. 8, 1996

[51] Int. Cl.$^6$ ........................................................ E04B 1/32
[52] U.S. Cl. .................................. 52/86; 52/88; 52/2.11; 52/2.18; 47/29; 47/28.1; 135/124; 135/125; 135/115; 135/900
[58] Field of Search ................................ 52/2.11–2.18, 6, 52/86, 88, 222; 47/29, 28.1, 48.5, 79; 135/124, 125, 115, 900, 901, 902

[56] References Cited

U.S. PATENT DOCUMENTS

| | | | |
|---|---|---|---|
| 2,626,483 | 1/1953 | Service | 47/29 X |
| 3,059,657 | 10/1962 | Turner | 135/120.1 X |
| 3,093,930 | 6/1963 | Witkowski | 47/29 |
| 3,206,892 | 9/1965 | Telkes et al. | 47/29 |
| 3,270,461 | 9/1966 | Fowler | 47/2 |
| 3,800,468 | 4/1974 | de Graff | 47/28 |
| 4,856,228 | 8/1989 | Robinson, Sr. | 47/29 |

FOREIGN PATENT DOCUMENTS

| | | |
|---|---|---|
| 2 551 481 | 3/1985 | France . |
| 2 560 742 | 9/1985 | France . |
| 2 627 345 | 8/1989 | France . |
| 713 761 | 9/1968 | Germany . |
| 8 403 946 | 7/1986 | Netherlands . |

*Primary Examiner*—Creighton Smith
*Assistant Examiner*—W. Glenn Edwards
*Attorney, Agent, or Firm*—Welsh & Katz, Ltd.

[57] ABSTRACT

An inflatable building construction, in particular suitable for use as a tunnel greenhouse comprising a film which is kept in an operative condition doming a predetermined useful space through an air pressure that has been increased relative to the environment, and which film has longitudinal edges anchored to the ground, wherein, for anchoring the longitudinal edges of the film, at least one flexible hose or tube is used which lies on and/or against a longitudinal edge provided in a trench in the bottom and which is filled with a fluid under excess pressure, which hose or tube clamps the film edges in the trench.

18 Claims, 2 Drawing Sheets

INFLATABLE BUILDING CONSTRUCTION

The invention relates to an inflatable building construction, in particular suitable for use as a tunnel greenhouse comprising a film which is held, through an air pressure which has been increased relative to the environment, in an operating condition doming a predetermined useful space, and which film has longitudinal edges anchored to the ground.

Such constructions are known from practice in various types, for instance in the form of tunnel greenhouses. In the simplest embodiment, such a tunnel greenhouse consists of an elongated strip of plastic film whose longitudinal edges are dug in in the ground, the portion between the dug-in longitudinal edges being held in a dome-shaped position through increased air pressure provided by a fan. At the outer ends thereof, an air lock can for instance be provided and/or the end edge can be dug in in the ground.

With such a film greenhouse, all forces acting on the film should be taken up by the dug-in longitudinal edges. In another known embodiment, a net is spread over the tunnel greenhouse, whose edges are again dug in in the ground, and is attached to ground anchors on either side of the tunnel greenhouse. Although the use of such net involves the longitudinal edges having to be dug in less far to obtain a stable construction, a drawback of using a net is that it requires an extra strip of costly horticultural ground on either side of the tunnel greenhouse proper. Also, fitting a net over a tunnel greenhouse is troublesome and labor-intensive.

A drawback of the two above-described types of tunnel greenhouses is that it is almost impossible to release the dug-in film edges again without damage. The removal of earth lying on and against a dug-in film edge by means of a plow or the like inevitably results in the film being damaged. Also when a dug-in film edge is released manually, by means of a shovel, which is often unacceptably time-consuming, damage to the film is practically unavoidable. Hence, in practice, the known tunnel greenhouses made of film are suitable for being used only once. Also, the known types of tunnel greenhouses are poorly resistant to storm.

It is observed that U.S. Pat. No. 4,856,228 and Dutch Patent Application 8403946 disclose film greenhouses wherein the edges of the film are provided with ballast compartments which are formed on the film and can be filled with water. However, these compartments exclusively serve to weight the film edges and do not lie in a trench. Also, these ballast compartments do not exert a clamping force on the film edges. These known constructions are not properly resistant to high wind and storm.

It is the object of the invention to overcome the drawbacks outlined and to provide an efficient tunnel greenhouse formed from film, which tunnel greenhouse can readily be installed or removed and is properly resistant to storm.

To this end, in accordance with the invention, a tunnel greenhouse of the above-described type is characterized in that for anchoring the longitudinal edges of the film, at least one expandable hose or tube is used which lies on and/or against a longitudinal edge provided in a trench in the bottom and which is filled with at least one fluid under excess pressure, clamping the film edges in the trench. In accordance with the invention, a method for installing a tunnel greenhouse made of film is characterized in that for anchoring each longitudinal edge, a trench is mechanically provided in the ground; that a longitudinal edge of the film is placed in the trench and that at least one expandable hose or tube is placed on and/or against the longitudinal edge lying in the trench, which expandable hose or tube is filled under excess pressure with a suitable fluid for anchoring the longitudinal edge. The film can then no longer be pulled loose. The force called up by the fastening/anchoring is often greater than the strength of the film.

Figure 2:
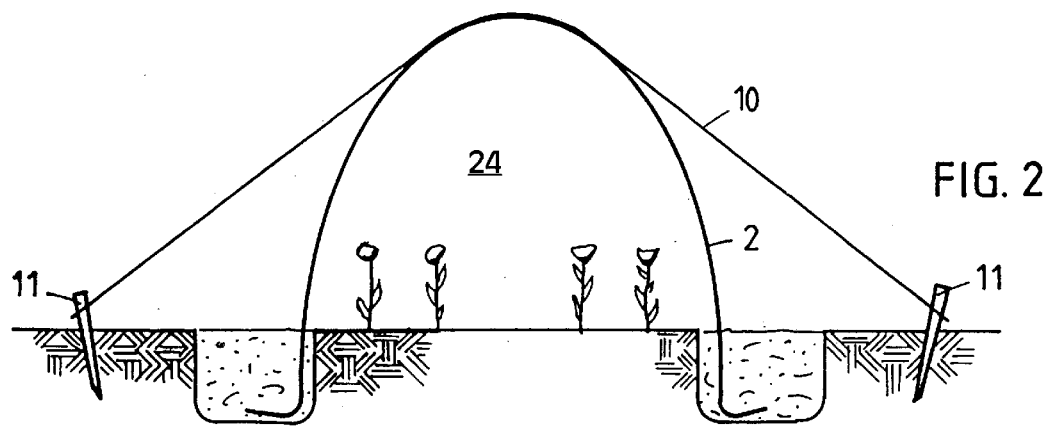
Figure 3:
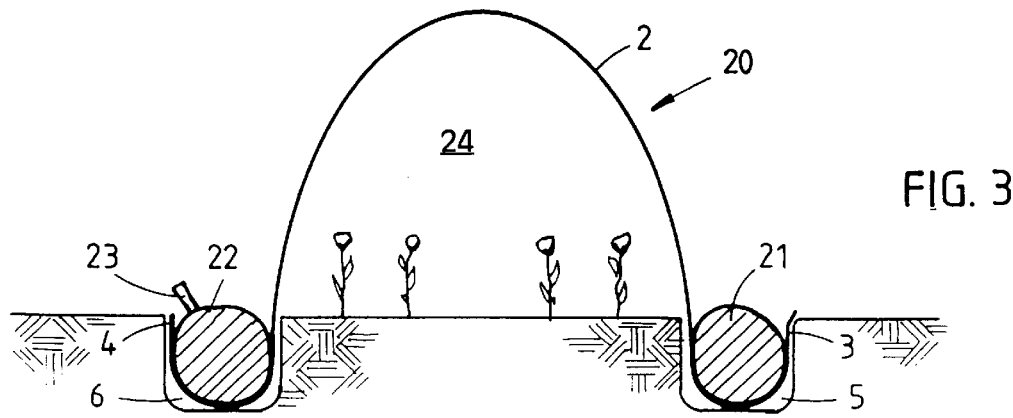
Figure 4:
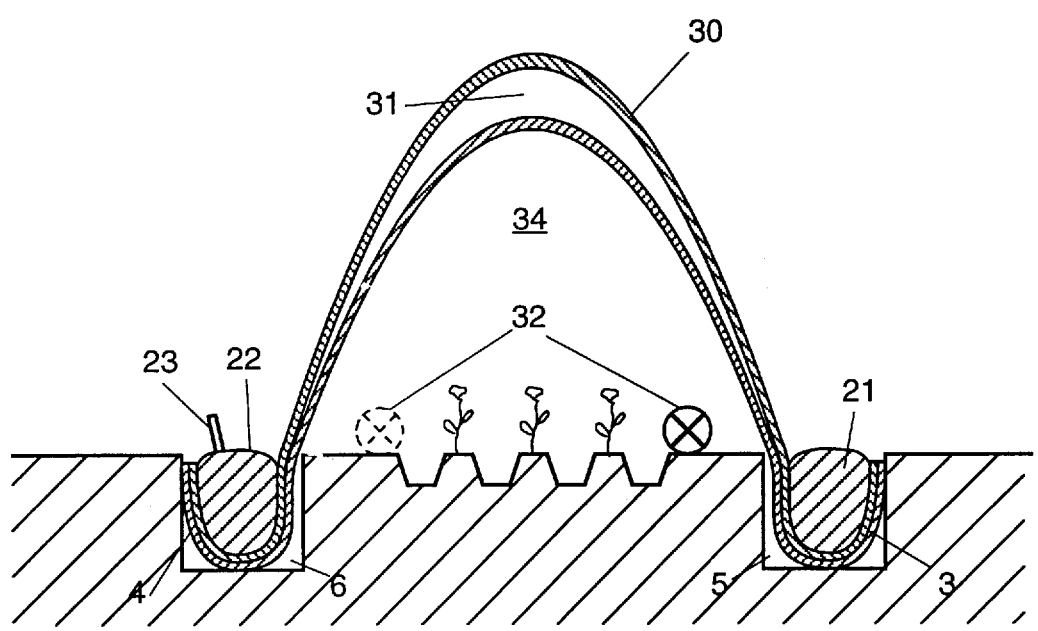

Hereinafter, the invention will be further described with reference to the accompanying drawings, wherein:

FIG. 1 schematically shows, in cross section, a known tunnel greenhouse made of film;

FIG. 2 schematically shows, in cross section, another known tunnel greenhouse made of film;

FIG. 3 schematically shows, in cross section, an example of a film greenhouse according to the invention; and FIG. 4 schematically shows a variant of FIG. 3.

FIG. 1 schematically shows, in cross section, a first example of a known film tunnel greenhouse 1. The film tunnel greenhouse shown is built up by means of an elongated strip of a suitable plastic film 2 which is commercially available for this purpose, for instance polyethylene, whose longitudinal edges 3, 4 are dug in in the ground in order to fix the tunnel greenhouse. By means of, for instance, a fan, an excess pressure is created under the plastic film, in operation, whereby the tunnel greenhouse adopts and retains the shape shown in the Figure, so that a greenhouse space for the crops 9 is formed. In practice, the tunnel greenhouse can at one or both ends thereof be provided, in a usual manner, with an air lock having a sealing flap, not shown, forming a closable access opening. The end edge of the film can lie over the air lock and be dug in next to the air lock. In practice, such a tunnel greenhouse can have a length of many tens of meters, even 100 m or more.

The longitudinal edge 3 and 4 are preferably placed in a plowed furrow 5,6. In the drawing, the furrow 5 is already filled with soil, while the furrow 6 is still open. The earth wall thrown up during the plowing or trenching of the furrows, such as the wall indicated at 7, can be pushed into the furrows again with the plow, as indicated by an arrow 8.

It may appear from the Figure that, in practice, it is practically impossible to dig out the film edges without involving damage. Hence, in practice, such film tunnel greenhouses can again be used only once. Also, the anchoring of the film is relatively weak, so that the storm resistance is slight.

A similar drawback holds for the film tunnel greenhouse shown in FIG. 2, which substantially corresponds to the film tunnel greenhouse shown in FIG. 1. The construction shown in FIG. 2 differs from the construction shown in FIG. 1 in that a net, schematically indicated at 10, is spread over the film tunnel 2, which net forms an additional anchoring for the greenhouse. The net 10 is anchored in the ground on either side of the film tunnel greenhouse by means of ground anchors 11. A drawback of this construction is that on either side of the film tunnel greenhouse, strips of ground are occupied which is then no longer available for the growth of crops. Further, fitting the net and in particular the ground anchors is labor-intensive and time-consuming. In this case, too, the anchoring of the film is relatively heavy, so that the storm resistance is poor.

FIG. 3 schematically shows, in cross section, an example of a film tunnel greenhouse 20 according to the invention. Like the film tunnel greenhouses of FIGS. 1 and 2, the film tunnel greenhouse of FIG. 3 consists of a strip of film 2 having longitudinal edges 3 and 4, which are anchored in or to the ground. For the sake of clarity, the film is drawn in double lines and with a sectional hatching. The longitudinal edges lie in trenches 5, 6 made by hand, a plow, trencher or chain digger or the like. However, the trenches are not filled up with earth lying on the longitudinal edges, but with an expandable hose 21,22 filled with a pressurized fluid, for instance water or air, which hose lies on and/or against the longitudinal edges lying in the trenches and anchors them. The hoses can be manufactured from any suitable, pressure-resistant and optionally reinforced material, for instance rubber, canvas, plastic, et cetera. The hoses can be filled in situ, i.e. while lying in the trenches, for instance by means of a water or air hose connected to a suitable valve, as is schematically indicated at 23. The water hose can be connected to a pump or the public water supply system or the like, and if an air hose is used, it can be connected to a compressor. The hose is filled under increased pressure, causing it to press the film edges 3,4 firmly against the bottom and/or sidewalls, but at least against a sidewall of the trenches 5,6, depending on the manner in which the film is placed in the trenches. Hence, the film edges are clamped in the trenches. It is also possible to fill the hoses first partly, while the hoses are still lying next to the trenches, and then roll the hoses into the trenches and bring them to the proper pressure.

As the trenches are not filled up through plowing after the film edges have been fitted, there is no risk of the film edges, if placed relatively far into the trenches, being folded back. When pressurized anchoring hoses are used, the film edges can without any problem be placed in the trenches so that the film edges extend across the entire width of the bottom and across the opposite wall of the trenches. By bringing the anchoring hoses to their proper pressure, very great forces can be generated (hundreds or even thousands of kilos).

A substantial advantage of the film tunnel greenhouse according to the invention is that it can be taken down readily, swiftly and without damage. For this purpose, one only has to remove the hoses 21, 22 and then roll up or fold up the film. The removal of the hoses can take place by emptying them (completely or partly) in the trenches and then taking them away, or by first pulling the hoses from the trenches gradually and placing them next to the trenches, and emptying them (further) only later.

Normally, the film of the tunnel greenhouse according to the invention which has been taken down remains undamaged and can hence be reused. From a business economics point of view, this also renders it possible to employ a high-quality film which is properly resistant to unfavorable weather conditions such as high wind and storm. Accordingly, such a film greenhouse can be used earlier in the season. Another advantage of high-quality film is that in the event of damage it can usually be repaired again, which is often not the case with films of a lesser quality. When high-quality films are used, the storm resistance is very good.

If a film greenhouse is damaged by storm all the same, it can be replaced very swiftly, owing to the use of the pressure-hose anchoring, so that the crops are not lost. On the other hand, the film greenhouse can also be taken down very quickly if, early in the growth season, the temperature suddenly rises, which may be unfavorable to the crops.

The film tunnel greenhouse according to the invention also offers the possibility of adjusting the greenhouse height during the growth season. For instance, it is possible to fold over one or both edges of the film a number of times and then fit the hoses 21, 22 early in the season. Accordingly, the actual greenhouse space 24 remains relatively low, which enables a quick warming-up to a relatively high temperature. This permits a rapid development of the crops in the initial phase. Then, at least one of the hoses can be temporarily removed from the trench, the associated longitudinal edge can be slightly unfolded, creating more space in the central part, and the hose can be fitted again. It is also possible to partly empty the hose and then to pull a fold lying under the hose from the film so as to create more space in the central part.

In this manner, the film tunnel greenhouse can relatively simply be adapted to the development or the nature of the crops, and to the changing type of weather during the successive seasons.

A greenhouse according to the invention is highly suitable for use in asparagus growing. When a greenhouse according to the invention is used for asparagus growing, the loss of area can be very slight or even nil if the longitudinal edges of the film are anchored in a suitable place between the asparagus ridges. Unlike the known greenhouses, a greenhouse according to the invention can even be erected on existing plots without adaptation. When a low tunnel is used in early spring, as described hereinabove, the asparagus harvesting can be advanced by some weeks. Of course, this also holds for other crops.

It is observed that after the foregoing, various modifications may readily occur to a skilled person. For instance, an inflatable construction as described hereinabove may have a purpose of use other than being utilized as a greenhouse. One may think of utilizations as temporary abode for persons or animals, storage place for agricultural products, such as for instance potatoes, temporary workshop, temporary accommodation during events, et cetera. Further, per longitudinal edge, several expandable hoses or tubes may be used, whose ends interconnect. Also, if so desired, a few filled hoses or tubes of relatively slight diameters could in each case be arranged next to each other, in the same trench or in a number of parallel trenches. Further, a similar anchoring could be used at the end faces of the tunnel greenhouse, for instance by means of a short hose or by means of a curved section of an anchoring hose lying on a longitudinal edge of the film. Further, in principle, for the filling of the hoses, a liquid other than water can be used or a gas other than air. If so desired, a pump can be used for emptying a hose, for instance a submerged pump fitted in the hose (if the hose if filled with liquid), or a suction pump connected to the valve. Also, if so desired, the hoses may form one whole with the (greenhouse) film. Further, it is possible to partly fill the anchoring hoses with liquid and then bring them to the desired pressure by means of a gas. Optionally, the anchoring according to the invention can of course also be combined with the use of a net, for instance in the case of large spans. Further, rain water can be discharged over and/or along the anchoring hoses to a low point where the water is discharged further. In addition, a tunnel greenhouse according to the invention can also be of a double-walled design. For this purpose, for instance, after a first film greenhouse has been erected, which is anchored by pressure hoses or the like, a second film greenhouse is placed over the first one and anchored by associated pressure hoses. The ratio of the air pressures in the inner film greenhouse, the air pressure in the space between the inner and the outer film greenhouse should then be adjusted so that the inner greenhouse remains upright inside the outer greenhouse while maintaining a certain interspace between the two films. For this purpose, two fans can for instance be used: one for the inner greenhouse and one for the interspace. A variant of a double-walled film greenhouse for both the anchoring and the fan arrangement is shown in FIG. 4.

FIG. 4 schematically shows, in cross section, an example of a film greenhouse according to the invention in double-walled design. The film greenhouse shown in FIG. 4 differs from the film greenhouse shown in FIG. 3 in that a second film cover 30 is provided over the first film 2. Between the two films, an interspace 31 is maintained by means of a fan, creating an insulating effect. For this purpose, in the example shown, a first fan 32 is used, which supplies outside air to the space 31 between the two films, while a second fan 33 is added, shown in broken lines in FIG. 4, which supplies air from the space 31 to the space 34 within the first or inner film 2. In the example shown, the two films are anchored by the same pressure hose or tube 22. As indicated hereinabove, separate pressure hoses or tubes can also be used, if so desired, but this requires an extra trench and extra ground area. These and similar modifications are understood to fall within the framework of the invention.

I claim:

1. An inflatable building construction, in particular suitable for use as a tunnel greenhouse comprising a film, said film being kept in an operative condition doming a predetermined useful space through an air pressure that has been increased relative to the environment, said film having longitudinal edges anchored in a substantially open trench said building construction further including at least one expandable hose or tube laying in the trench and engaging the longitudinal edge of said film in the trench said hose or tube being filled with fluid under pressure, thereby pressing the longitudinal edge of said film against at least one wall of the trench and firmly retaining the film edges in the trench.

2. A construction according to claim 1, characterized in that the at least one expandable hose or tube is integral with the film of the film greenhouse.

3. A construction according to claim 1, characterized in that the at least one expandable hose or tube comprises a connecting member for a filling line.

4. A construction according to claim 1, characterized in that the at least one expandable hose or tube comprises a submerged pump.

5. A construction according to claim 1, characterized in that the hose or tube is manufactured from flexible material.

6. A construction according to claim 1, characterized by a double-walled configuration with two film covers, spaced apart by means of air pressure.

7. A construction according to claim 6, characterized in that the edges of the two film covers are jointly retained in the same trench and by the same hose or tube.

8. A construction according to claim 6, characterized in that between the environment and the interspace between the two film covers, in operation, at least one first fan is operative and that between the space between the two film covers and the useful space, in operation, at least one second fan is operative.

9. A method for installing an inflatable building construction comprising a film which is kept in an operative condition doming a predetermined useful space through an air pressure that has been increased relative to the environment, including the steps of placing a longitudinal edge of said film in a substantially open trench, placing an expandable diaphragm on said longitudinal edge in said trench, filling said expandable diaphragm with a fluid under pressure, pressing said longitudinal edge against at least one of the walls of said trench with said pressure, and thereby retaining said longitudinal edge in said trench.

10. The method of claim 9 further including the step of pressing said longitudinal edge against both of said walls of said trench.

11. A method according to claim 9, characterized in that the expandable hose or tube is at least partly filled, while it is lying next to the trench, and is placed in the at least partly filled condition in the trench, and is then brought to excess pressure.

12. A method according to claim 9, characterized in that at least one of the longitudinal edges of the film is placed in the trench with one or more longitudinal folds so as to enable a subsequent elevation of the greenhouse space.

13. A method according to claim 9, characterized in that the hose or tube is partly filled with a liquid and partly with a gas.

14. A method according to claim 9, characterized in that the fluid comprises air.

15. A method according to claim 9, characterized in that the film is provided in two layers, whilst between the two layers an interspace is created by means of at least one fan operative between the environment and the interspace.

16. A method according to claim 9, characterized in that for creating excess pressure in the useful space, a fan is used which is operative between the interspace and the useful space.

17. A method according to claim 9, characterized in that the edges of the two layers are jointly placed in a trench and are anchored by means of the same at least one hose or tube.

18. The construction of claim 1 wherein said open trench has two opposing generally vertical walls, and said longitudinal edge is firmly pressed against both of said walls.

\* \* \* \* \*